US011298979B2

(12) United States Patent
Youn et al.

(10) Patent No.: US 11,298,979 B2
(45) Date of Patent: Apr. 12, 2022

(54) NON-PNEUMATIC TIRE

(71) Applicants: Hankook Tire & Technology Co., Ltd, Seoul (KR); Korea Advanced Institute of Science and Technology, Daejeon (KR)

(72) Inventors: Sung Hee Youn, Seoul (KR); Seok Ju Choi, Daejeon (KR); Myong Joong Lee, Daejeon (KR); Jeong Mu Heo, Daejeon (KR); Daniel Saakes, Daejeon (KR); Tek Jin Nam, Daejeon (KR); Seung Ryeol Kim, Daejeon (KR); Se Yeong Kim, Daejeon (KR); Yea Kyung Row, Daejeon (KR); Oo Sung Son, Daejeon (KR); Dong Hyeok Yun, Daejeon (KR); Kwang Eun Park, Daejeon (KR); Gi Tae Koo, Daejeon (KR); Jeong Yeon Lee, Daejeon (KR)

(73) Assignees: Hankook Tire & Technology Co., Ltd., Seoul (KR); Korea Advanced Institute of Science and Technology, Daejeon (KR)

( * ) Notice: Subject to any disclaimer, the term of this patent is extended or adjusted under 35 U.S.C. 154(b) by 247 days.

(21) Appl. No.: 16/673,635

(22) Filed: Nov. 4, 2019

(65) Prior Publication Data
US 2020/0139754 A1 May 7, 2020

(30) Foreign Application Priority Data

Nov. 5, 2018 (KR) ........................ 10-2018-0134658

(51) Int. Cl.
*B60C 7/20* (2006.01)
*B60C 7/10* (2006.01)
(Continued)

(52) U.S. Cl.
CPC .................. *B60C 7/20* (2013.01); *B60C 7/10* (2013.01); *B60C 7/22* (2013.01); *B60B 1/14* (2013.01); *B60B 21/06* (2013.01)

(58) Field of Classification Search
CPC .................................... B60C 7/20; B60C 7/22
See application file for complete search history.

(56) References Cited

U.S. PATENT DOCUMENTS

2014/0062168 A1\* 3/2014 Martin ...................... B60C 7/18
301/62
2017/0008342 A1\* 1/2017 Martin ...................... B60C 7/14

FOREIGN PATENT DOCUMENTS

KR    10-2004-0027984    4/2004
KR    10-2006-0051513    5/2006
(Continued)

*Primary Examiner* — Kip T Kotter
(74) *Attorney, Agent, or Firm* — Knobbe, Martens, Olson & Bear, LLP

(57) ABSTRACT

The disclosed technology generally relates to a tire, and more particularly to a non-pneumatic tire that has handling performance similar to a pneumatic tire, supports the load of a vehicle and improves riding comfort by employing a parametric structure. In one aspect, a non-pneumatic tire includes a tread that comes in contact with the ground, a rim that is connected with an axle, and a spoke unit that functions as a structural support between the rim and the tread, in which the spoke unit is formed by circularly arranging spokes. The spokes have a single closed-loop longitudinal cross-section circumscribed to the rim and around the center of the tire.

8 Claims, 5 Drawing Sheets

(51) Int. Cl.
*B60C 7/22* (2006.01)
*B60B 1/14* (2006.01)
*B60B 21/06* (2006.01)

(56) References Cited

FOREIGN PATENT DOCUMENTS

| | | | | |
|---|---|---|---|---|
| KR | 10-2008-0038274 | 5/2008 | | |
| KR | 10-2010-0090015 | 9/2010 | | |
| KR | 10-1725229 | 4/2017 | | |
| KR | 20180025748 A | * | 3/2018 | |
| WO | WO-2007057975 A1 | * | 5/2007 | ............... B60C 7/16 |

* cited by examiner

NON-PNEUMATIC TIRE

INCORPORATION BY REFERENCE TO ANY PRIORITY APPLICATIONS

This application claims foreign priority to Korean Patent Application No. 10-2018-0134658, filed Nov. 5, 2018, the content of which is incorporated by reference herein in its entirety.

BACKGROUND

Field

The disclosed technology generally relates to a tire, and more particularly to a non-pneumatic tire that has handling performance similar to a pneumatic tire, supports the load of a vehicle and improves riding comfort by employing a parametric structure.

Description of the Related Technology

Tires that are generally used can be classified into a radial tire, a bias tire, a solid tire, etc. in accordance with the structure, and the radial tire, that is, a pneumatic tire among them are used in passenger vehicles and vehicles except for special purpose vehicles. However, such a pneumatic tire has a complicated structure, requires over eight steps of manufacturing processes, discharges a non-ignorable amount of noxious substances, is accompanied by inconvenience in management such as continuously checking the air pressure that is absolutely important in performance display and safety of a pneumatic tire, and a problem with safety such as damage to the tire due to external objects pricking and applying a shock to the tire during driving.

However, a non-pneumatic tire which is, unlike the pneumatic tire, manufactured in a new structure with a new concept process that can not only greatly decrease the manufacturing cost, but also considerably decrease energy consumption and the amount of produced noxious substances, has a great advantage in that it can overcome the problem that may be caused by insufficient air pressure. Further, the non-pneumatic tire has another advantage in that it is possible to prevent standing wave, which is generated in the pneumatic tire, and remarkably reduce rotational resistance.

Since the non-pneumatic tire has a structure completely different from that of the pneumatic tire of the related art and is designed in a type that never uses compressed air unlike the pneumatic type, it is free from accidents that may occur during driving due to a loss of air pressure or insufficient air pressure (a flat tire).

There were non-pneumatic tires in the related art. Aside from carriage wheel and bicycle wheels, recently, there are a technology of supporting the load of a tire with several supports including several layers of staples in Korean Patent Application No. 2006-0051513, and a technology of providing a configuration composed of a main body made of an elastic material, a circumferential extending crown functioning as a grounding surface, and an extending side wall bonded to the crown in Korean Paten Application No. 2008-0038274. Further, there is disclosed a non-pneumatic tire including a reinforced ring-shaped band that supports the load of the tire, and a plurality of web spokes that transmits load between a wheel and a hub in an extended state in Korean Patent Application No. 2004-0027984. Recently, a technology of an airless tire configured to absorb shock through a honeycomb-shaped shock-absorbing part and to support pressure applied to the tire has been disclosed (Application No. 10-2010-0090015).

Non-pneumatic tires including a plurality of web spokes have been known to support load using only a structural reinforcing member at the tread and the tensile force of the web spokes. However, when load is supported by tensile force and compression force, it is possible to guide a more stable and appropriate grounding surface and it is accordingly possible to maximize the performance of a vehicle, including maneuverability, braking force, riding comfort, etc., as compared with when load is supported only by tensile force. Accordingly, more improved performance can be expected in a vehicle.

The disclosed technology is characterized by having a unique spoke structure derived using a parametric design method and a hollow type or fiber type reinforcing member on a tread in comparison to a non-pneumatic tire (Korean Patent No. 10-1725229) that has been introduced as a recent technology. Further, spokes are jointed, so the structure is excellent in rigidity and durability as a tire. In particular, the disclosed technology relates to a non-pneumatic tire in which the spoke structure derived by a parametric design is left-right asymmetric or sloped in the rotational direction of a tire, so it is possible to prevent a decrease in contact area and improve handling performance when cornering, and when a hollow type reinforcing member is applied, the vibration absorption ability during driving is excellent, thereby having the advantage of being able to improve riding comfort.

SUMMARY OF CERTAIN INVENTIVE ASPECTS

An object of the disclosed technology is to provide a non-pneumatic tire that secures a sufficient supporting force and minimizes a loss of contact area in cornering.

The objects to implement in the present invention are not limited to the technical problems described above and other objects that are not stated herein will be clearly understood by those skilled in the art from the following specifications.

In order to achieve the objects, an embodiment of the disclosed technology provides a non-pneumatic tire including a tread 100 that comes in contact with the ground, a rim 300 that is connected with an axle, and a spoke unit 200 that functions as a structural support between the rim 300 and the tread 100, in which the spoke unit 200 is formed by circularly arranging spokes 210, which have a single closed-loop longitudinal cross-section circumscribed to the rim 300, around the center O of the tire.

DETAILED DESCRIPTION OF THE CERTAIN ILLUSTRATIVE EMBODIMENTS

Figure 1:
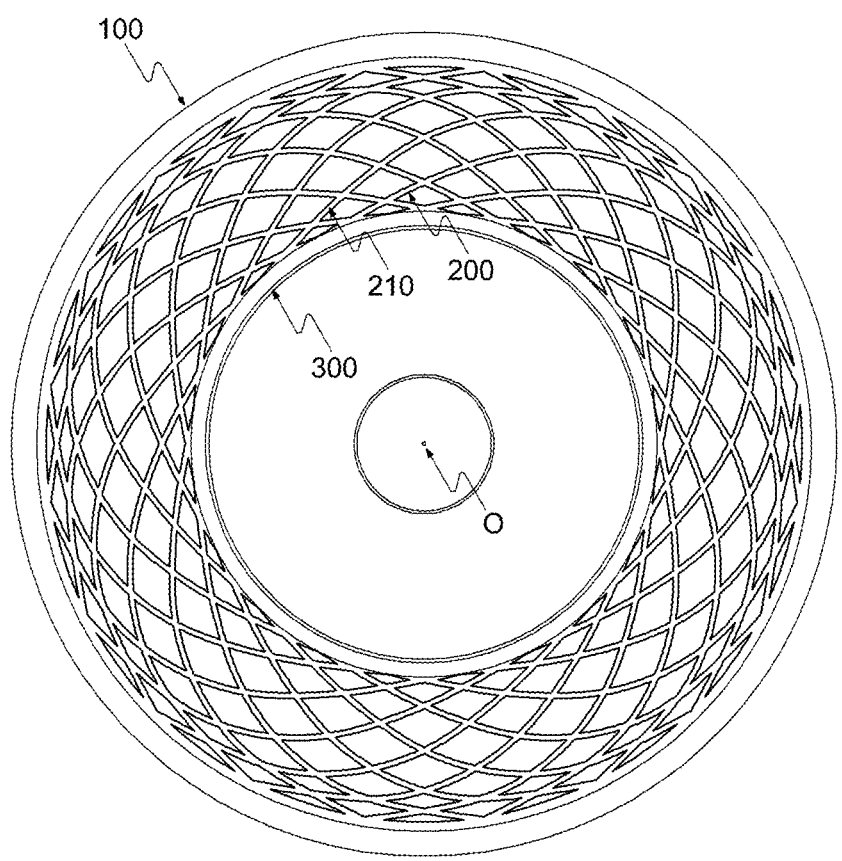
FIG. 1 is a side view of a non-pneumatic tire according to some embodiments.

Hereinafter, the present invention is described with reference to the accompanying drawings. However, the present invention may be modified in various different ways and is not limited to the embodiments described herein. Further, in the accompanying drawings, components irrelevant to the description will be omitted in order to obviously describe the present invention, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, embodiments are described in detail with reference to the accompanying drawings.

FIG. 1 is a side view of a non-pneumatic tire according to some embodiments. The disclosed technology relates to a tire, particularly, a non-pneumatic tire that has handling performance similar to a pneumatic tire while not using air pressure, and supports the load of a vehicle and improve riding comfort by employing a parametric structure. The illustrated embodiment provides a non-pneumatic tire including a tread 100 that comes in contact with the ground, a rim 300 that is connected with an axle, and a spoke unit 200 that functions as a structural support between the rim 300 and the tread 100, in which the spoke unit 200 is formed by circularly arranging spokes 210, which have a single closed-loop longitudinal cross-section circumscribed to the rim 300, around the center O of the tire.

The shape of the circular arrangement around the center O of the tire of the spokes 210 having a single closed-loop longitudinal cross-section makes a parametric structure, thereby uniformly distributing an applied load. The parametric design has a structural advantage in that since the start point and the end point of the spoke are connected, an optimal curve is formed in driving and riding comfort can be maximized by adjusting the density in the spokes.

Figure 2:
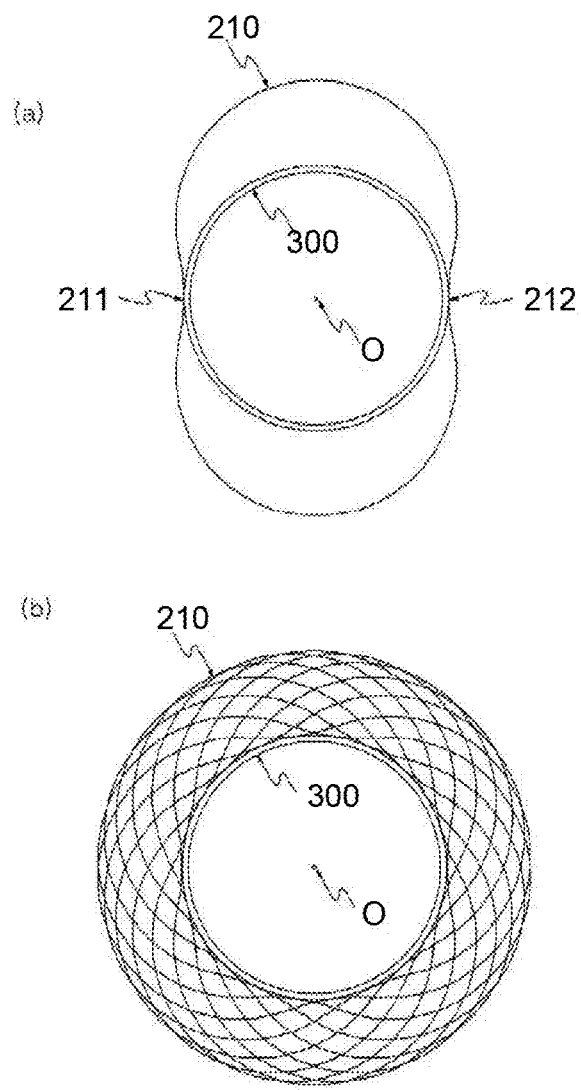
FIGS. 2 and 3 are views illustrating that spokes having a single closed-loop longitudinal cross-section form a spoke unit in the non-pneumatic tire according to some embodiments.
Figure 3:
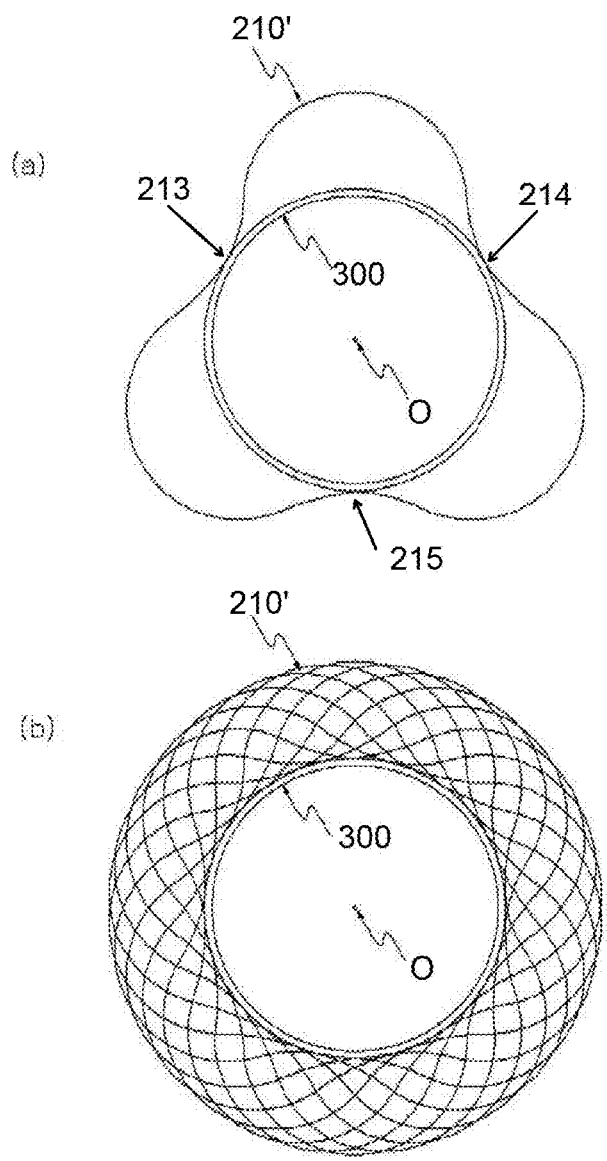

FIGS. 2 and 3 are views illustrating that spokes having a single closed-loop vertical cross-section form a spoke unit in the non-pneumatic tire according to some embodiments. As shown in FIG. 2, the spoke 210 having a single closed-loop longitudinal cross-section of the spoke unit 200 may have a tumbler shape having two contact points 211 and 212 on the rim 300. In this case, it is preferable that seven to twenty one spokes 210 having a single closed-loop longitudinal cross-section of the spoke unit 200 are circularly arranged around the center O of the tire.

Further, as shown in FIG. 3, the spoke 210' having a single closed-loop longitudinal cross-section of the spoke unit 200 may have a configuration having three contact points 213, 214, and 215 on the rim 300. In this case, it is preferable that four to twenty one spokes 210' having a single closed-loop longitudinal cross-section of the spoke unit 200 are circularly arranged around the center O of the tire. When the number of spokes 210' having a single closed-loop longitudinal cross-section is small, a non-uniform profile is formed at the tread 100 and uniformity of the tire is deteriorated. Further, when the number of spokes 210' having single closed-loop longitudinal cross-section is big, the internal spaces formed by the spokes 210' having a single closed-loop longitudinal cross-section excessively increase, so the tire takes long time to return to the initial shape after deforming. In this case, the balance of a vehicle that is being driven is broken, so a severe accident may be caused.

It may be possible to increase the contact points of the spokes having a single closed-loop longitudinal cross-section on the rim 300, but it is meaningless because there is no difference from cases of being multiples of the two cases described above.

Figure 4:
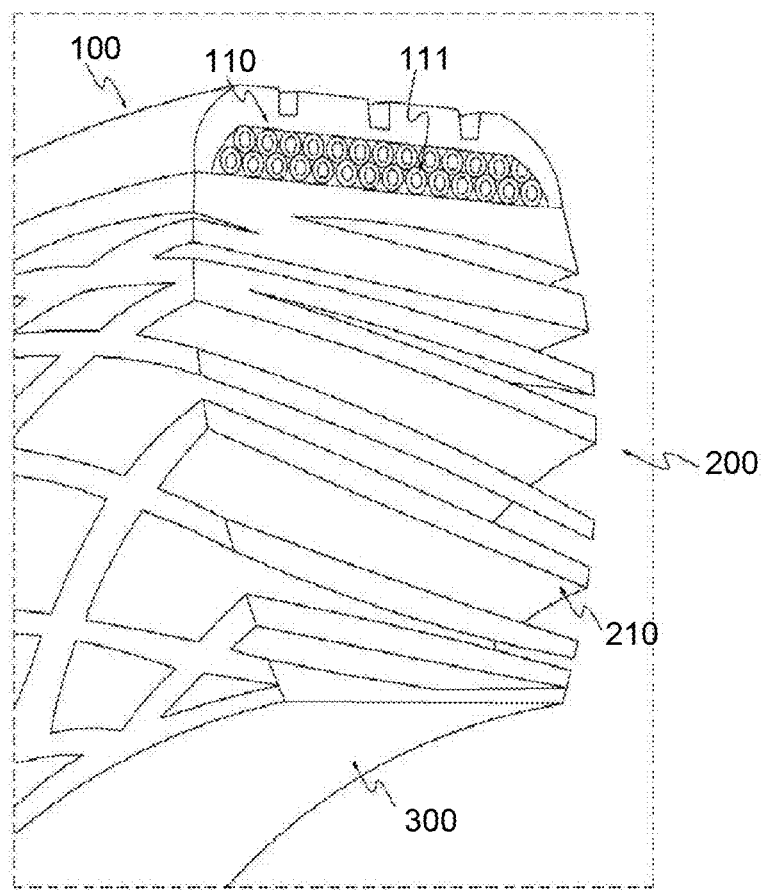
FIG. 4 is a perspective view of main parts of the non-pneumatic tire according to some embodiments.

Further, the illustrated embodiment of the disclosed technology, as shown in FIG. 4, provides a configuration in which the spokes 210 having single closed-loop longitudinal cross-section have an inclined axial cross-section. According to this configuration, the structure of the spoke unit 200 has a structure in which inside and outside are asymmetric. Accordingly, it is possible to expect improvement of the handling performance in cornering.

Figure 5:
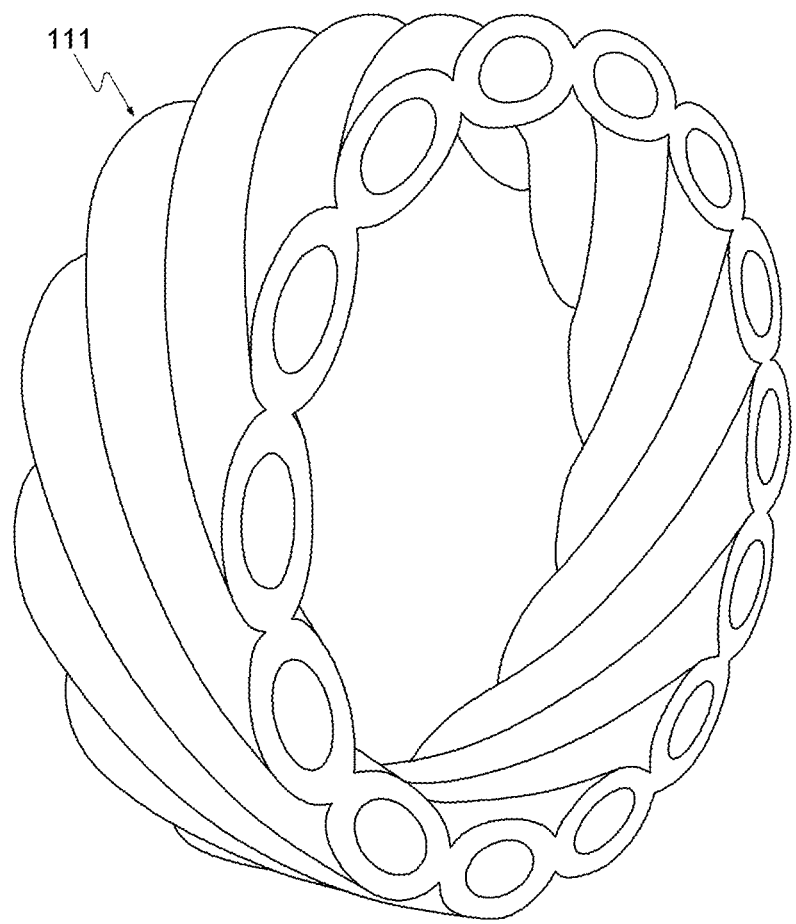
FIG. 5 is a perspective view of main parts of a reinforcing tube of a structure reinforcing material layer of the non-pneumatic tire according to some embodiments.

Further, the illustrated embodiment provides a configuration in which a structure reinforcing material layer 110 is installed on the bottom of the tread 100. The structure reinforcing material layer 110 is a set of reinforcing tubes 111 wound one to three times around an axis. This configuration is a pipe structure formed by winding one tube around a wheel axis. Since structures having grains in different direction are stacked, durability and uniformity are improved. FIG. 5 is a perspective view of main parts of a reinforcing tube of a structure reinforcing material layer of the non-pneumatic tire according to some embodiments. As shown in FIG. 5, it is preferable that the reinforcing tubes 111 are formed by twisting tubes having a smaller diameter.

That is, unlike the related art in which the general performance is controlled only by spokes, in the disclosed embodiments, the two to three-stage cylindrical structure reinforcing material layer 110 minimizes deformation of the spoke unit 200 and enables the performance of the tread 100 to be actively adjusted. Accordingly, it is possible to adjust the performance into a sporty mode that requires rigidity or a comfort mode, depending on driving modes.

As described above, according to the disclosed embodiments, a structure reinforcing material structure that is advantageous in terms of handling performance and vibration absorption in cornering of a tire that supports the load of a vehicle is structurally applied and used, thereby improving maneuverability and riding comfort. The embodiments are directed to a non-pneumatic tire having sufficient structural rigidity, therefore it is possible to sufficiently support the load of a vehicle and maximize harmony of characteristics of handling and riding comfort.

The non-pneumatic tire according to embodiments uses a parametric structure at a spoke unit, secures a sufficient supporting force against the load of a vehicle body, improves riding comfort by absorbing vibration during driving, and minimizes a loss of contact area in cornering. Since the non-pneumatic tire according to embodiments is a non-pneumatic tire that does not require injection of air, there is no concern of flat tire.

That is, the parametric spoke structure is asymmetric inside and outside, so the handling performance is improved in cornering. Further, parametric structure makes adjustment of rigidity of the spoke unit easy, thereby being able to provide optimal riding comfort. Further, the parametric structure can provide a streamline profile similar to a pneumatic tire, so it is possible to expect an effect of reducing air resistance by making airflow smooth.

Further, it is possible to expect an effect of minimizing deformation of spokes and improving durability by applying a cylindrical structure reinforcing material in the disclosed embodiments.

That is, disclosed embodiments improve the actual performance of a non-pneumatic tire intended to improve maneuverability and riding comfort by using a structure reinforcing material structure that is advantageous in terms of handling performance and vibration absorption in cornering of a tire that supports the load of a vehicle. Since the embodiments have an asymmetric spoke structure and a hollow type of structure reinforcing material structure, it is possible to sufficiently secure structural rigidity as a non-pneumatic time, as compared with the spokes stated in the related art. Further, it is possible to maximize harmony of characteristics of handling and riding comfort.

The above description is provided as an exemplary embodiment of the present invention and it should be understood that the present invention may be easily modified in other various ways without changing the spirit or the necessary features of the present invention by those skilled in the art. Therefore, the embodiments described above are only examples and should not be construed as being limitative in all respects. For example, the components described as single parts may be divided and the components described as separate parts may be integrated.

The scope of the present invention is defined by the following claims, and all of changes and modifications obtained from the meaning and range of claims and equivalent concepts should be construed as being included in the scope of the present invention.

The effects of the present invention are not limited thereto and it should be understood that the effects include all effects that can be inferred from the configuration of the present invention described in the following specification or claims.

What is claimed is:

1. A non-pneumatic tire assembly comprising:
   a tread configured to come in contact with the ground;
   a rim connected with an axle; and
   a spoke unit that serves as a structural support between the rim and the tread,
   wherein the spoke unit is formed by a plurality of spokes circularly arranged around the rim, the spoke unit having a single closed-loop longitudinal cross-section circumscribed to the rim and around a center of the tire, wherein each of the spokes encloses an entire circumference of the rim and contacts the rim at only two or three points.

2. The non-pneumatic tire assembly of claim 1, wherein each spoke having the single closed-loop longitudinal cross-section of the spoke unit has only two contact points with the rim.

3. The non-pneumatic tire assembly of claim 2, wherein seven to twenty one spokes having the single closed-loop longitudinal cross-section of the spoke unit are circularly arranged around the center of the tire.

4. The non-pneumatic tire assembly of claim 1, wherein each spoke having the single closed-loop longitudinal cross-section of the spoke unit has only three contact points with the rim.

5. The non-pneumatic tire assembly of claim 4, wherein four to twenty one spokes having the single closed-loop longitudinal cross-section of the spoke unit are circularly arranged around the center of the tire.

6. The non-pneumatic tire assembly of claim 1, wherein the spokes having the single closed-loop longitudinal cross-section have an inclined axial cross-section.

7. The non-pneumatic tire assembly of claim 1, wherein a structure reinforcing material layer is installed on the bottom of the tread.

8. The non-pneumatic tire assembly of claim 7, wherein the structure reinforcing material layer is a set of reinforcing tubes wound one to three times around an axis.

\* \* \* \* \*